(No Model.)

D. I. KUHN.
MOTOR FOR OPERATING CHURNS OR WASHING MACHINES.

No. 247,068. Patented Sept. 13, 1881.

Witnesses
Uriah Ryan
Eleanor Hamill

Inventor
David I. Kuhn

UNITED STATES PATENT OFFICE.

DAVID I. KUHN, OF PENN TOWNSHIP, ALLEGHENY COUNTY, PENNSYLVANIA.

MOTOR FOR OPERATING CHURNS OR WASHING-MACHINES.

SPECIFICATION forming part of Letters Patent No. 247,068, dated September 13, 1881.

Application filed July 22, 1881. (No model.)

*To all whom it may concern:*

Be it known that I, DAVID I. KUHN, a citizen of the United States, residing in Penn township, in the county of Allegheny and State of Pennsylvania, have invented a new and useful Motor for Operating Churns or Washing-Machines, of which the following is a specification.

The object of my invention is to combine in one machine a dog-power churn and washer. I attain this object by the mechanism illustrated in the accompanying drawings, in which—

Figure 1:
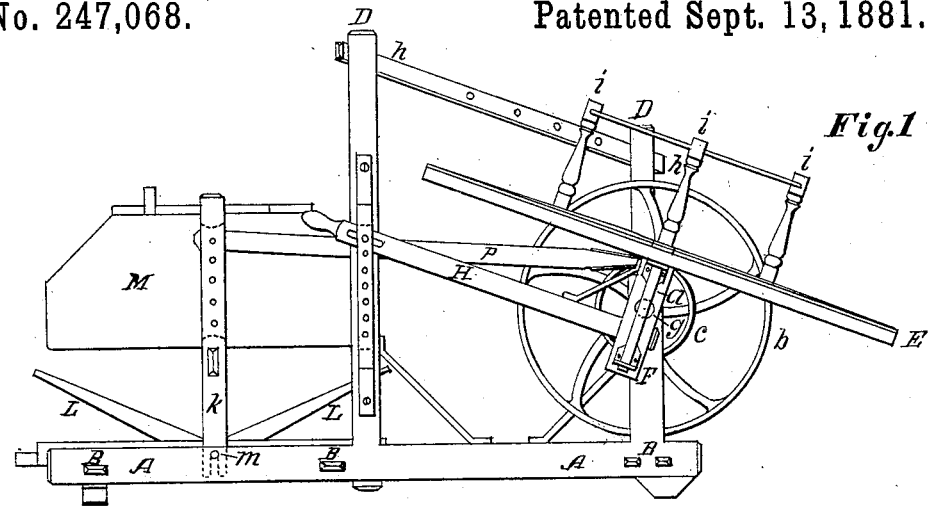
Figure 2:
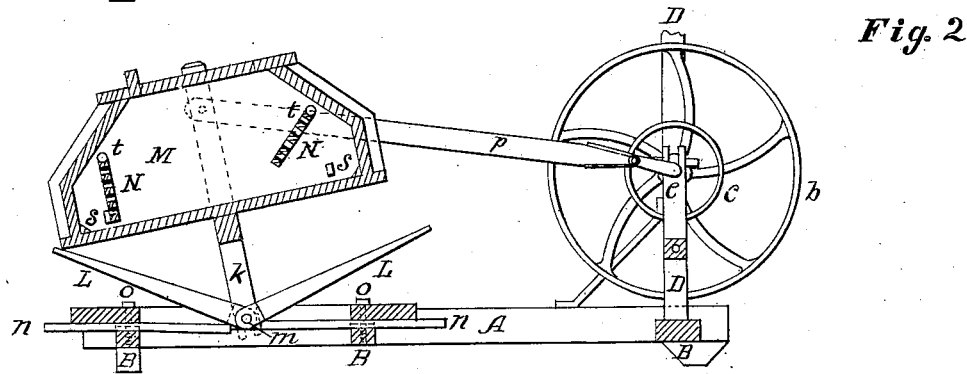
Figure 3:
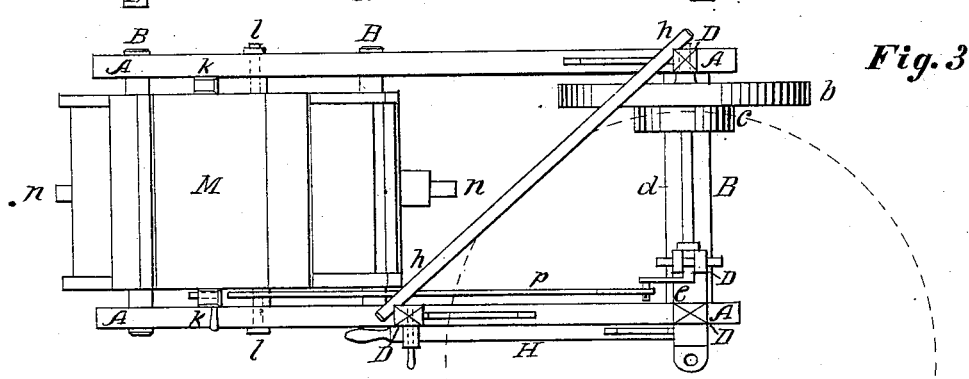
Figure 4:
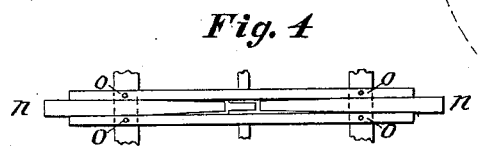

Figure 1 is a side view of the entire machine. Fig. 2 is a vertical section through churn or washer, and showing their connection with dog-power. Fig. 3 is a top view of machine as it appears after removal of tread-wheel, the circular dotted lines showing the position occupied by tread-wheel. Fig. 4 is a detail view, looking upward, of the springs under churn or washer-box.

Similar letters refer to corresponding parts throughout the several views.

The sills A, the cross-bars B, and the posts D constitute the frame-work of the machine.

E is the tread-wheel, with bolt $a$ passing down through lugs secured to the adjustable bar F.

$b$ is the fly-wheel, with the friction-roller $c$ and shaft $d$, with crank $e$. The adjustable bar F turns on a pin, $g$, this pin being in line with shaft of fly-wheel $d$.

The pitch or slope of tread-wheel is adjusted by the lever H, it being secured by tenon and brace to bar F.

$h\ h$ are a diagonal brace or rail, with perforations for tying dog to, and serves the purpose of keeping the animal from jumping off of tread-wheel.

$i\ i$ are standards, with a ring passing around through them for the purpose of compelling the animal to walk near outer edge of tread-wheel.

M is the churn-box, with standards $k$, pivoted on the bolt $l$ at $m$, and is connected with shaft $d$ and fly-wheel $b$ by crank $e$ and pitman $p$, the churn being operated with a rocking motion.

The levers L L, in connection with the springs $n\ n$, receive the shock of box caused by the action of its contents as it alternately comes in contact with said levers, thereby balancing the motion of box and taking the strain off of other parts of machine. The springs $n\ n$ are adjustable by loosening the screws $o\ o$, when they may be slipped in or out, as desired.

The dashers N N are perforated, and extend across the ends of churn-box. They are pivoted at $t\ t$ and provided with stops secured to the box at $s\ s$. The dashers have an inward-swinging motion, thus allowing the liquid in the ends of box to freely pass as the relative ends of box are elevated, and closing against the stops when depressed.

The washer-box, with the exception of the dashers N N, is the perfect counterpart of the churn-box. It takes the same place and is operated in the same manner, the action of the water caused by the movement of machinery being all that is necessary for cleansing the contents of the box.

I am aware that dog-powers have been made with an adjustable rotary tread-wheel and with crank on inner end of shaft. I am also aware that churns and washing-machines have been made with a box having a rocking or swinging motion. I therefore do not claim such a combination, broadly; but What I do claim, and wish to secure by Letters Patent, is—

1. In combination with the dog-power and rocking boxes of a churn or washer, the standards $k$, pivoted at a distance below the bottom of box and operated by the crank $e$ and pitman $p$, substantially as described.

2. The springs under the box for the purpose of relieving the machine of the strain caused by the action of the contents within the box, substantially as described.

DAVID I. KUHN.

Witnesses:
URIAH RYAN,
ELEANOR HAMILL.